March 16, 1943. T. TEMPLE 2,314,254
DEVICE FOR TESTING FOCAL PLANE CAMERA SHUTTERS
Filed June 3, 1939 3 Sheets-Sheet 1
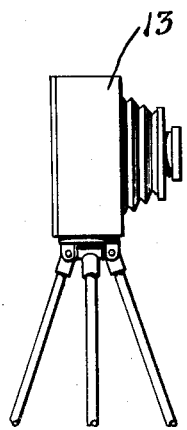
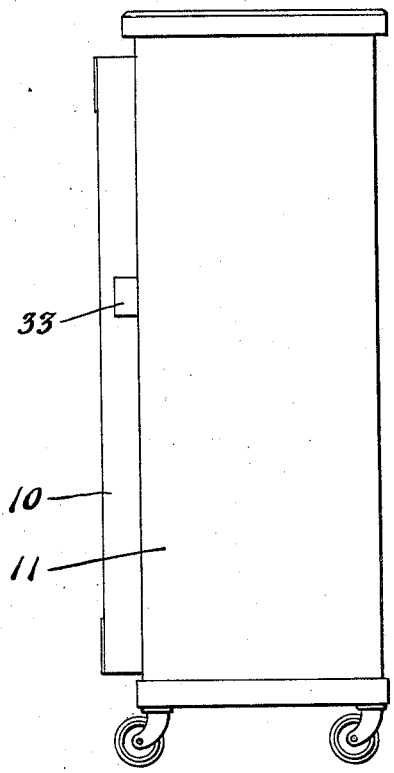
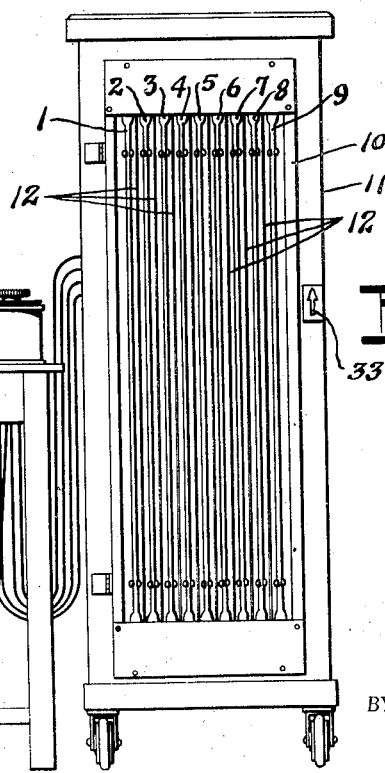
INVENTOR.
Trevor Temple
BY
his ATTORNEY.

March 16, 1943.   T. TEMPLE   2,314,254
DEVICE FOR TESTING FOCAL PLANE CAMERA SHUTTERS
Filed June 3, 1939   3 Sheets-Sheet 2
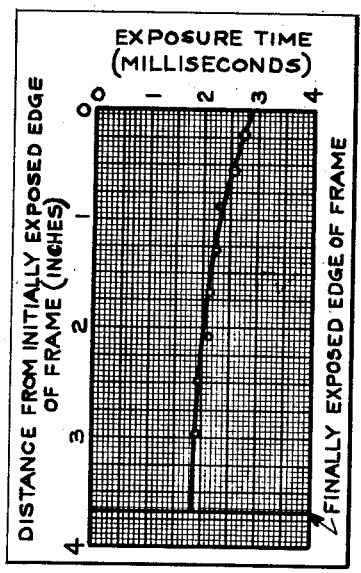
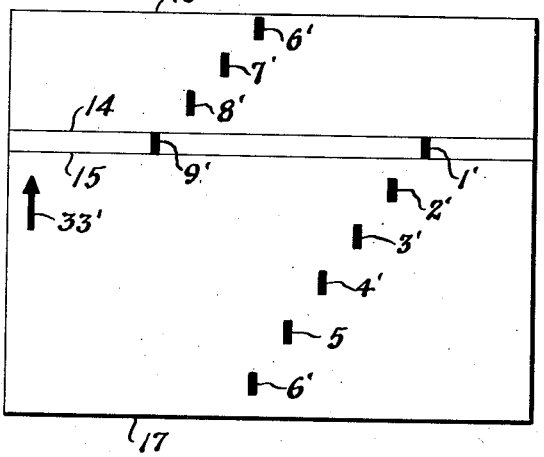
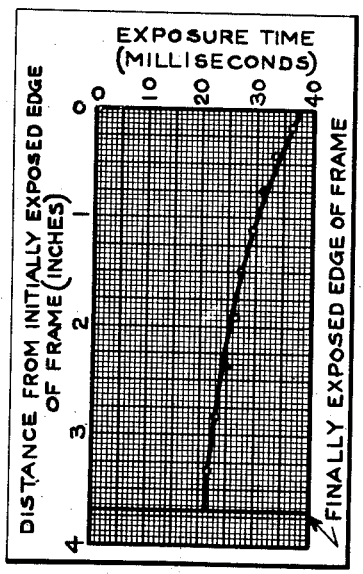
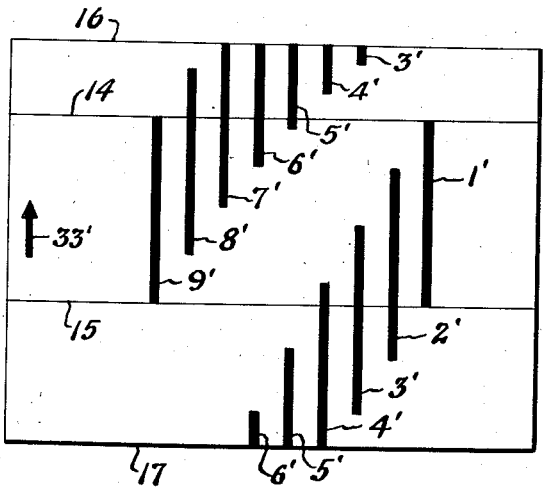
INVENTOR.
Trevor Temple
BY
ATTORNEY.

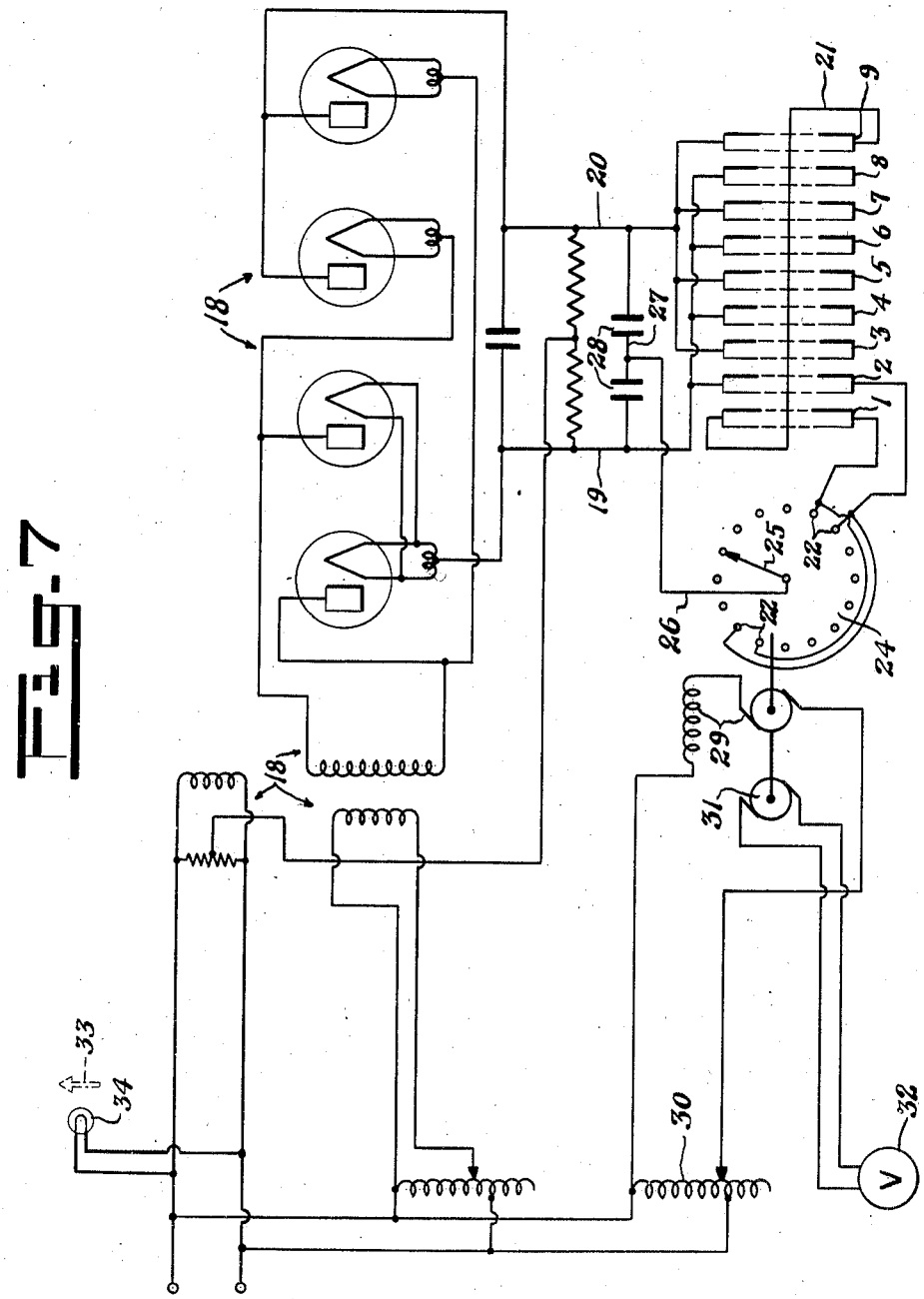

Patented Mar. 16, 1943

2,314,254

UNITED STATES PATENT OFFICE 2,314,254

DEVICE FOR TESTING FOCAL PLANE CAMERA SHUTTERS

Trevor Temple, Tappan, N. Y., assignor to Electrical Testing Laboratories, New York, N. Y., a corporation of New York Application June 3, 1939, Serial No. 277,329

3 Claims. (Cl. 176—124)

This invention relates to a new and useful improvement in a device for testing focal plane camera shutters. One type of focal-plane shutter for cameras consists essentially of a curtain of opaque flexible material provided with several rectangular slots or openings of varying width, each at least as long as the width of the film, and spaced apart a somewhat greater distance than the length of the portion of the film to be exposed. The ends of this curtain are wound upon two rollers positioned, respectively, adjacent the top and bottom of the camera so that the intervening portion of the curtain lies in front of the film.

The camera is set for an exposure by winding the curtain on to one roller until the desired opening has been drawn past the film, light being excluded from the film by other means during this operation. To make the exposure, this opening is caused to pass back across the film at a speed regulated by the tension of a spring by means of which the other roller is actuated. Thus the exposure of the film is determined by the width of opening selected and the speed of its passage across the film.

Another type of focal-plane shutter consists of a curtain which is parted in the middle, the two halves being separately actuated so that, as they pass across the film during the exposure, a gap appears between them. The shutter is reset by winding the curtain backward with the parting gap closed, thus avoiding the need for separate means for excluding light from the film.

The camera is provided on its exterior with devices which, theoretically, enable the operator to set the shutter for any one of a number of different exposures, but generally some, or all, of these settings are far from accurate, so that a shutter set to give an exposure of one one-thousandth of a second, for example, may, in fact, given an exposure of one-fivehundredth of a second, or twice the indicated and intended exposure.

The primary object of this invention is the production of a device, by means of which the actual exposure time of a focal-plane shutter can be determined.

Since the exposure is produced by the progressive passage of one of the rectangular openings in the curtain across the film, the time of exposure cannot be determined, as in the case of the between-lens type of shutter, by measuring the total time that light is incident on the film, but by measuring the time interval between passage of the initial edge of the opening in the curtain past a particular point on the film and the passage of the trailing edge of the opening past the same point. Theoretically, one such measurement should be sufficient, but it is known that the speed of the passage of the curtain opening across the film is not constant, but variable. Furthermore, in the action of the parted curtain type of shutter, the width of the gap between the halves of the curtain may vary as it passes across the film. For these reasons the exposure times at different points may be different; therefore, to obtain an accurate record of exposure time, measurements should be made at a number of points on the film, the number depending upon the precision required. By this invention such measurements may be made with ease and accuracy and under conditions similar to those encountered in the ordinary use of the camera.

One form of the device embodying the invention which has been selected for purposes of description herein, but without any intention of limiting the invention thereto, is shown in the accompanying drawings, of which:

Figure 1 is a side elevation of the device with a camera in position;

Figure 2 is a front elevation of the device;

Figure 3 is a reproduction of an exposure made by the camera with the shutter operating at high speed;

Figure 4 is a similar record of an exposure made at relatively low speed;

Figures 5 and 6 show graphically the exposure times obtained from the exposures of Figures 3 and 4; and Figure 7 illustrates diagrammatically the device and the electric circuits thereof.

The form of the device shown consists of a number of gaseous discharge tubes, such as neon tubes, for example, nine such tubes 1—9 being shown in Figure 2, mounted in parallel arrangement in a frame 10 attached to one face of a housing 11, and separated by thin black partitions 12 to prevent reflections. These tubes are so connected to a suitable source of electricity and controlling devices, that they may be caused to flash in sequence at definite predetermined intervals, with the exception of the ninth tube, which is arranged to flash simultaneously with tube 1. If the tubes are so caused to flash and an exposure made with a camera 13 set up in front of them, as shown in Figure 1 so that all of the tubes are included within its field, and also so that the direction of motion of the curtain of the focal-plane shutter is parallel to the tubes, a picture will result consisting of a series of staggered bars of the general nature of those shown in Figures 3 and 4. Since the duration of each flash is extremely short, for example, of the order of 10 microseconds, the length of each bar represents the projection upon the film of the width of the opening in the curtain, or, more accurately, the width of the part of the film exposed through the opening of the curtain at the instant of occurrence of one of the flashes, and each succeeding bar represents the picture of a portion of a different tube taken in the order in which they flash.

Since the length of the interval between flashes of the tubes is definitely known, the distances between successive images and the number of images of the tubes thus recorded on the film by the passage of the curtain opening across it, makes it possible to determine the time consumed in the passage of the opening past a given point, and the total time of passage across the film, or, in short, the actual exposure time which may then be compared with the time indicated by the shutter mechanism.

Assume, for example, that a camera is being tested which has a focal-plane shutter set for a theoretical exposure of one one-thousandth of a second, using a "one-eighth" curtain opening, according to the indicator; assume, also, that the tubes 1 to 8 of the testing device are caused to flash successively in the order named at intervals of 4.48 milliseconds, and that tube 9 flashes simultaneously with tube 1. When the exposure is made the negative will resemble Figure 3. Each bar is the picture of a portion of a tube. Assuming that the curtain slit moves downwardly, the top bar represents the first tube to flash; the next lower bar, the second tube, etc., and the length of each bar represents the width of the part of the film exposed through the curtain slot at the instant of one of the flashes. The identity of the bars is immaterial, but, for the purposes of this explanation, they have been numbered 1' to 9' in Figure 3 to correspond with the nine tubes of the device. Neither is it material in what order the tubes are flashed, or what pair of tubes is flashed simultaneously. The arrangement suggested is convenient for making the required measurements, but not essential.

Since tubes 1 and 9 were flashed simultaneously, the tops and bottoms of their images, bars 1' and 9', respectively, can be joined together by straight lines, 14 and 15, to form synchronous base lines, from either of which the distance to the top and bottom of each bar can be determined, and also the distance between the bottom of one bar and the bottom of the next in the order in which they were produced, which distances can be converted into exposure times for the line on the film represented by the bottom of each bar.

For example, assume that line 14 joining tops of images 1' and 9', is chosen as a base line. The distances between the top and bottom of the first bar 6' and base line 14 are 1.06" and .86", respectively. The length of the bar is .20". The distance between the top of the second bar 7' and base line 14 is .73"; therefore, since the trailing edge of the curtain opening moved from the top of bar 6' to the top of bar 7' between the flashes of the corresponding tubes, it traveled .33". The time consumed by the curtain in moving this distance of .33" is known to have been 4.48 milliseconds. The curtain speed may be assumed to have been substantially constant over this relatively short distance so that it follows that the time taken by the trailing edge of the curtain opening to move from the top to the bottom of bar 6' was $^{20}/_{33}$ of the interval between the flashing of tubes 6' and 7', or $^{20}/_{33}$ of 4.48 milliseconds, or 2.72 milliseconds; therefore, the time of exposure of the line across the film at the bottom of bar 6' was 2.72 milliseconds.

The exposure time at a line across the film at the bottom of bar 7' may be obtained in a similar way. Its top and bottom are .73" and .53", respectively, from the base line 14; therefore, since the image was produced when the leading edge of the curtain opening was coincident with the bottom of the bar, the curtain moved .20" before the trailing edge of the curtain reached the bottom of bar 7'. The top of bar 8' is .38" from the base line 14; therefore, between the flashings of tubes 7 and 8, the curtain moved .35". The time interval during which this distance was covered is known to be 4.48 milliseconds as before. Therefore, the time of exposure of the line across the film at the bottom of bar 7' was $^{20}/_{35}$ of 4.48 milliseconds, or 2.56 milliseconds.

Similarly, the exposure times of the remaining parts of the film represented by the other bars can be determined and will be found to diminish progressively to 1.91 milliseconds.

Thus, it is made evident that the speed of the shutter increased as it passed across the film, and, consequently, that the top of the film received a longer exposure than the bottom, and also that the shutter is from approximately two to three times slower than its rated speed.

The total duration of exposure, i. e., the time required for the shutter to cross the entire film from one edge of the frame to the other can also be ascertained by adding to the total of the times of the flash intervals recorded, the time consumed by the motion of the curtain opening between the emergence of its leading edge from the top edge 16 of the frame, and its arrival at the position at which the first flash was recorded, and the time consumed by the movement of the trailing edge of the slot from its position when the last flash was recorded to its disappearance behind the bottom edge 17 of the frame.

The initial time of exposure before the first flash occurred may be determined as follows: The distance from the upper edge 16 of the frame to the base line 14 is 1.08"; the distance from the bottom of first bar 6' to the base line is .86"; therefore, in the interval between the emergence of the leading edge of the curtain opening from edge 16 of the frame and its arrival at the bottom of the first bar, the curtain traveled .22". Since the bottom of bar 6' is .86" from base line 14, and the bottom of bar 7' is .53" from the base line, the curtain traveled .33" in the interval between the first and second flashes. Again assuming that the speed of the curtain was substantially uniform within this short interval, the time consumed by this initial stage of the motion of the curtain was $^{22}/_{33}$ of 4.48 milliseconds, or 2.99 milliseconds. Figuring in a similar manner the final stage of the travel of the curtain after the flash of the last tube recorded, the time consumed will be found to have been $^{44}/_{47}$ of 4.48 milliseconds, or 4.19 milliseconds.

The time consumed by the curtain in moving from one flash point to the next being known to be 4.48 milliseconds and there being eight such intervals, the time between the first and the last flash recorded was eight times 4.48 milliseconds.

or 35.84 milliseconds. Adding to this the times for the initial and final stages of the travel of the curtain, 2.99 milliseconds and 4.19 milliseconds, respectively, gives a total exposure time of 43.02 milliseconds.

Figure 4 is a reproduction of another photograph of the same general character as that of Figure 3. In this case, however, the opening in the shutter curtain was that indicated by the mechanism as 1½" in width, and the indicated speed as 1/35 of a second.

In this instance the line 15 connecting the bottoms of the images of tubes 1 and 9 was selected as a base line, and measurements taken similar to those already described in connection with Figure 3. The actual exposure of the various points on the film determined by the bottoms of the several images recorded will be found to have varied from 36.3 milliseconds to 22 milliseconds, as compared with an indicated uniform exposure of 1/35 second. It will be noted that in this instance the exposure varied from considerably more to considerably less than that indicated by the camera mechanism. The total duration of exposure of the entire surface of the film was 90.6 milliseconds.

The results obtained as above described can be reproduced graphically as the curves shown in Figures 5 and 6, respectively.

Suitable mechanisms for causing the gaseous discharge tubes to flash in the sequence heretofore indicated, and the electric circuit therefor, is diagrammatically illustrated in Figure 7, although any other suitable arrangement may be employed, depending, among other things, upon the character of the source of electric current. In Figure 7 the source has been assumed to be the ordinary 120 volt, 60 cycle, alternating current. This current is converted into direct current of, say, 8000 volts by means of a suitable transformer and rectifier, such as that generally indicated at 18, conducted to one of the electrodes of each of the tubes 2 to 9—tubes 2, 4, 6 and 8 being connected to one side 19 of the output circuit and tubes 3, 5, 7 and 9 to the other side 20 of the output circuit. The other electrode of tube 9 is connected to one electrode of tube 1, as indicated by wire 21. The remaining electrodes of tubes 1 to 8 are each connected individually to two fixed points 22 of a commutator 24.

As shown, the commutator 24 is provided with sixteen points; therefore, each tube is connected to two diametrically-opposed points so that it will flash twice during each rotation of the commutator arm 25. This arm 25 is preferably so constructed that when its end passes each point, there will be a very small gap across which the current passes by means of a small arc. The end of the arm and the point should, of course, be made of a suitable material for this service, such, for example, as spark plug wire.

The rotating arm 25 of the commutator 24 is connected through a slip-ring (not shown) by a wire 26 to a wire 27 between a pair of capacitors 28 bridged between the two sides 19 and 20, respectively, of the output of the rectifier.

With this arrangement, when the rotating arm 25 of the commutator passes one of the stationary points 22, the tube to which it is connected being also connected to, say, the plus side of the voltage supply, the condenser which is connected to the plus side will discharge through the tube, and the other condenser which is connected to the minus side, will become charged. As the moving arm passes the next stationary point, the condenser which is connected to the minus side will now discharge, since the tube which is connected to the said stationary point is also connected to the minus side, and the other condenser will become charged. Since both the charging and the discharging currents flow through the tubes, the average tube current is twice the supply current.

Arm 25 of the commutator may be mounted upon the shaft of a small universal series motor 29, the speed of which may be varied over a wide range by any suitable device such as a variable ratio autotransformer 30 commonly known as a "Variac."

Since the speed of rotation of arm 25 determines the interval between the flashing of the gaseous discharge tubes, the speed should be so adjusted with respect to the characteristics of the shutter to be tested that the images of the tubes will be recorded on the film in a manner convenient for making the required measurements. If the speed is too great, the tops and bottoms of successive images will overlap, whereas if the speed is too low, too few images will be recorded. Therefore, the operator will regulate the speed of the motor so as to produce the images at the desired spacing on the film. To enable the operator to do this, the form of device described herein includes a device by means of which the speed of the motor, and, consequently, the rate of flashing of the tubes, can be controlled with accuracy. That suggested and illustrated in Figure 7 is an electric tachometer 31 attached to the shaft of motor 29. As is well known, the voltage output of such a tachometer is directly proportional to its speed of rotation, so that its output can be conducted to a suitable voltmeter 32 calibrated in revolutions per second instead of volts or so as to show directly the time interval between flashes. With this arrangement described, the flash rate of each of the tubes will be twice the rate at which the motor 29 and the commutator arm 25 are rotating, since each tube is connected to opposed points 22 of commutator 24.

To enable the top of the negative to be distinguished with ease, the apparatus may be provided with an upwardly pointing illuminated arrow 33 positioned upon the housing 11 so as to be included within the field of exposure. This will result in an equivalent image 33' on the negative, as shown in Figures 3 and 4, pointing toward the top of the negative. This arrow may be illuminated by any suitable means such as a concealed electric bulb 34 receiving its current from the same source as that of the apparatus.

Any other type of circuit and commutator may be employed which will produce current surges of extremely short duration through the gaseous discharge tubes in consecutive order at equal known intervals of time, or, in fact, any other type of apparatus which will produce images representing with substantial accuracy the position of the curtain opening at known intervals of time. The apparatus and circuit described is capable of doing this since each flash is, for practical purposes, instantaneous, so that there is no observable motion of the curtain during it and the time intervals between flashes are equal and of known duration.

I claim:

1. A device for determining the exposure time of a focal plane shutter, which includes a source of light composed of a plurality of gaseous discharge tubes in spaced parallel arrangement, a source of direct electric current for energizing said tubes, one electrode of some of said tubes being connected to the positive and one electrode of the others of said tubes being connected to the negative side of said source, two capacitors in series bridged between the positive and negative sides of said source, and a rotary commutator connected to a point of said bridging circuit between said capacitors and connectible to the other electrode of each of the aforementioned tubes adapted to complete the circuits to the tubes connected to the positive and negative sides of said source in sequence and in alternation at equal known time intervals.

2. A device for determining the exposure time of a focal plane shutter, which includes a source of light composed of a plurality of gaseous discharge tubes in spaced parallel arrangement, a source of direct electric current for energizing said tubes, one electrode of some of said tubes being connected to the positive and one electrode of the others of said tubes being connected to the negative side of said source, two capacitors in series bridged between the positive and negative sides of said source, a rotary commutator connected to a point of said bridging circuit between said capacitors and connectible to the other electrode of each of the aforementioned tubes adapted to complete the circuits to the tubes connected to the positive and negative sides of said source in sequence and in alternation at equal time intervals, and an electric tachometer associated with said commutator and adapted to accurately indicate directly the length of the time interval between the completion of successive circuits.

3. A device for determining the exposure time for a focal plane shutter, which includes a normally dark source of light composed of a plurality of gaseous discharge tubes in spaced parallel arrangement, a source of direct electric current for energizing said tubes, one electrode of half of said tubes being connected to the positive and one electrode of the remainder of said tubes being connected to the negative side of said electric source, two capacitors connected in series across said electric source, a switch consisting of a moving element connected into the circuit between said two capacitors, and a plurality of contacts engageable by said moving element in sequence, each of said contacts being connected to the other electrode of a different one of said tubes so that each of the tubes connected to the positive side of said source may be caused to flash in sequence with each of the tubes connected to the negative side of said source, an electric motor for driving said movable element of said switch at a constant speed, and an electric tachometer adapted to indicate directly the time interval between the making of successive connections between said movable element and each of said contacts.

TREVOR TEMPLE.